US009610563B2

(12) United States Patent
Gutierrez Cutino et al.

(10) Patent No.: US 9,610,563 B2
(45) Date of Patent: Apr. 4, 2017

(54) METHOD FOR ACTIVATION AND REGENERATION OF A FILTER MATERIAL AND THE FILTER MATERIAL THUS OBTAINED

(71) Applicant: Universidad De Santiago De Chile, Santiago (CL)

(72) Inventors: Marlen Del Carmen Gutierrez Cutino, Santiago (CL); Diego Alonso Venegas Yazigi, Santiago (CL); Evgenia Spodine Spiridinova, Santiago (CL)

(*) Notice: Subject to any disclaimer, the term of this patent is extended or adjusted under 35 U.S.C. 154(b) by 294 days.

(21) Appl. No.: 14/586,890

(22) Filed: Dec. 30, 2014

(65) Prior Publication Data

US 2015/0182948 A1    Jul. 2, 2015

(30) Foreign Application Priority Data

Dec. 30, 2013    (CL) .................................. 201303788

(51) Int. Cl.
| | | |
|---|---|---|
| *B01J 23/90* | (2006.01) | |
| *B01J 20/34* | (2006.01) | |
| *C02F 1/28* | (2006.01) | |
| *B01J 20/16* | (2006.01) | |
| *B01J 20/18* | (2006.01) | |

(52) U.S. Cl.
CPC ........... *B01J 20/3441* (2013.01); *B01J 20/16* (2013.01); *B01J 20/165* (2013.01); *B01J 20/18* (2013.01); *B01J 20/3408* (2013.01); *C02F 1/281* (2013.01); *C02F 2303/16* (2013.01)

(58) Field of Classification Search
CPC ......................................................... B01J 23/90
USPC ......................................... 502/25, 400, 514
See application file for complete search history.

(56) References Cited

U.S. PATENT DOCUMENTS

| | | |
|---|---|---|
| 5,262,024 A | 11/1993 | Lomasney et al. |
| 6,676,839 B1 | 1/2004 | McMahon |
| 2007/0017871 A1 | 1/2007 | Reddy et al. |
| 2009/0200233 A1 | 8/2009 | Bergendahl et al. |
| 2009/0261042 A1 | 10/2009 | Semiat et al. |
| 2013/0292336 A1 | 11/2013 | Douglas, Sr. |

FOREIGN PATENT DOCUMENTS

| | | |
|---|---|---|
| DE | 4443628 A1 | 6/1996 |
| WO | 91/02699 A1 | 3/1991 |
| WO | 2008/022562 A1 | 2/2008 |
| WO | 2009/000429 A1 | 12/2008 |
| WO | 2012/077033 A3 | 6/2012 |

*Primary Examiner* — Edward Johnson
(74) *Attorney, Agent, or Firm* — Law Offices of Jeff Williams; J. Oliver Williams

(57) ABSTRACT

The present invention relates to a filter material for water filters based on inorganic surfaces, whether they are natural or synthetic that it is regenerated after its first use and a method for activating and regenerating the filter material by the use of inert salt solutions and the energy provided by microwaves.

8 Claims, 4 Drawing Sheets

METHOD FOR ACTIVATION AND REGENERATION OF A FILTER MATERIAL AND THE FILTER MATERIAL THUS OBTAINED

BACKGROUND

1. Field of the Invention

The present invention relates to the field of chemistry, and in particular refers to a method for activation and regeneration of filter materials that are used for filtering fluids for human and animal consumption, as well as to the regenerated and activated materials which are obtained with the mentioned method.

2. Description of Related Art

Obtaining clean, drinkable and pure water coming from different sources, it is a never-ending task. It is common to find water contaminated by different causes and the lack of safety in the quality of water is a danger which the majority of the countries of the world do not escape from. Pollution levels lead to the constant search for systems for its disposal, and so, the use of filters is essential, these filters may be of different materials, depending on the pollutant that you want to eliminate. However the use of filters at the same time, contains another drawback, with them the contaminants are eliminated, but the contaminants are retained in the filters, and when the maximum limit of retention is reached (culmination of its useful life), it is necessary to replace it with another one, and this is where the new problem is generated, the environmental pollution due to the need for replacement of filters There is a wide variety of materials which are used in filters, where inorganic surfaces play an important role, both for contaminants that eliminated, as for the processes of regeneration. The aluminosilicates have different proportions of aluminium and silicon, which originates different structures, and also varied properties. Zeolite has been one of the materials most used for this purpose, due to its low cost and easy availability.

Other microporous hydrophobic materials have also been described (document WO 2007056717) for the production of filter devices. Methods have also been reported and compositions for removal of arsenic contamination of the water, where this method is based on the use of pumice covered with rusted metal (application for patent No. 2007017871 US).

Additionally, the patent application No. AU 2011340169, describes an organic-inorganic composite material based on metal, carbon and nitrogen oxide and other functional elements/groups for the removal of anionic contaminants such as arsenic, fluoride, etc. from water, and methods for making the same. The organic-inorganic compound may be produced from at least one biogenic material, such as chitin, Chitosan, bio-membrane and a metal salt such as iron, aluminium, etc. The organic-inorganic compound shows a high capacity of absorption of arsenic and fluoride under different conditions. In addition, this document describes a surprising regeneration of 98%-99%, using a new protocol for regeneration.

A wastewater purification method is described in patent application No. US 2013292336, is based on the use of catalytic oxidation for the removal of soluble metals. Catalytic oxidation can produce filtered water saturated with oxygen and high pH, resulting in a greater precipitation of soluble metals, when softening agents, such as sodium carbonate, are added in a stage of further processing.

In addition to the materials used for the removal of contaminants from liquids, several methods have been described, for the regeneration of these filter materials, for example, document WO2009000429, refers to a method for the regeneration of zeolite used for the treatment of contaminated water, said regeneration method is based on the use of heat energy in the presence of an air flow. The document WO2008022562 also describes a method for regeneration of adsorbent and filter material which is based on the use of thermal energy.

On the other hand, the patent application No. US 2009261042 discloses a filter made of an adsorbent material and regeneration treatment thereof through the use of nanoparticles.

Most of the methods for the regeneration of filter materials which are described in the literature on the subject, agree on the use of the heat energy as a way to remove impurities adsorbed to them (WO 2008022562, DE4443628, U.S. Pat. No. 6,676,839) for both zeolite and activated carbon.

Other methods (document WO 9102699) report the use of microwave radiation to remove or modify unwanted materials from the surface of a particulate substrate. This method is particularly useful for recyclable substrates for subsequent or later use. In this patent the treatment of alumina with microwave radiation for the removal of organic chemical compounds, is exemplified.

On the other hand, U.S. Pat. No. 5,262,024 reports a desorption process of ionic species associated to a matrix through the application of an energy wave. This document mentions that the desorption energy, can be microwave power, ultrasonic and sonic energy, as well as an electromagnetic potential, and that the electrolytes can enhance desorption. However, the realization examples of this document however, teach that this method works for soil contaminated with uranium and that electrolytes did not represent an improvement in the shown desorption process.

SUMMARY OF THE INVENTION

The present invention referrers to a method for activating and regenerating an inorganic filter material particularly obtained from an aluminosilicate, which is based on the combination of the application of a flow of inert salts and microwave radiation. Activation is accomplished by the use of inert salts of potassium or sodium solution, a concentration between 0.5-1.5 M, applying radiation energy from microwaves in the range of 600 to 1000 Watt (for 30 to 95 seconds). The effectiveness of activation is checked after the conventional process of sorption of contaminants (batch system).

In a preferred embodiment of the invention, for activation, the potassium salts solution are $KNO_3$ and KCl and are used at a concentration of 1M, which flow is applied to the filter media together with microwave radiation for a period of 1 minute. This process the product with a 90% of activity with respect to the initial product, is obtained.

In another preferred embodiment of the invention, for the activation, the solution of sodium salts are NaCl and $NaNO_3$ and are used in a concentration of 1M, whose flow is applied to the filter media together with microwave radiation for a period of 1 minute.

For the regeneration of the filter material the same method mentioned above is applies, with the only difference, that the salt solution includes a salt derived from KOH or NaOH, rather than KCl or NaCl, respectively, which presents a concentration between 1.5-3.5M, being the preferred concentration for the embodiment 2M.

Preferably the filter material is activated and regenerated by the present invention is zeolite.

The entire process is performed in the presence of natural atmosphere, requiring a constant agitation of the filter material subject to a flow of inert salts and microwave radiation.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
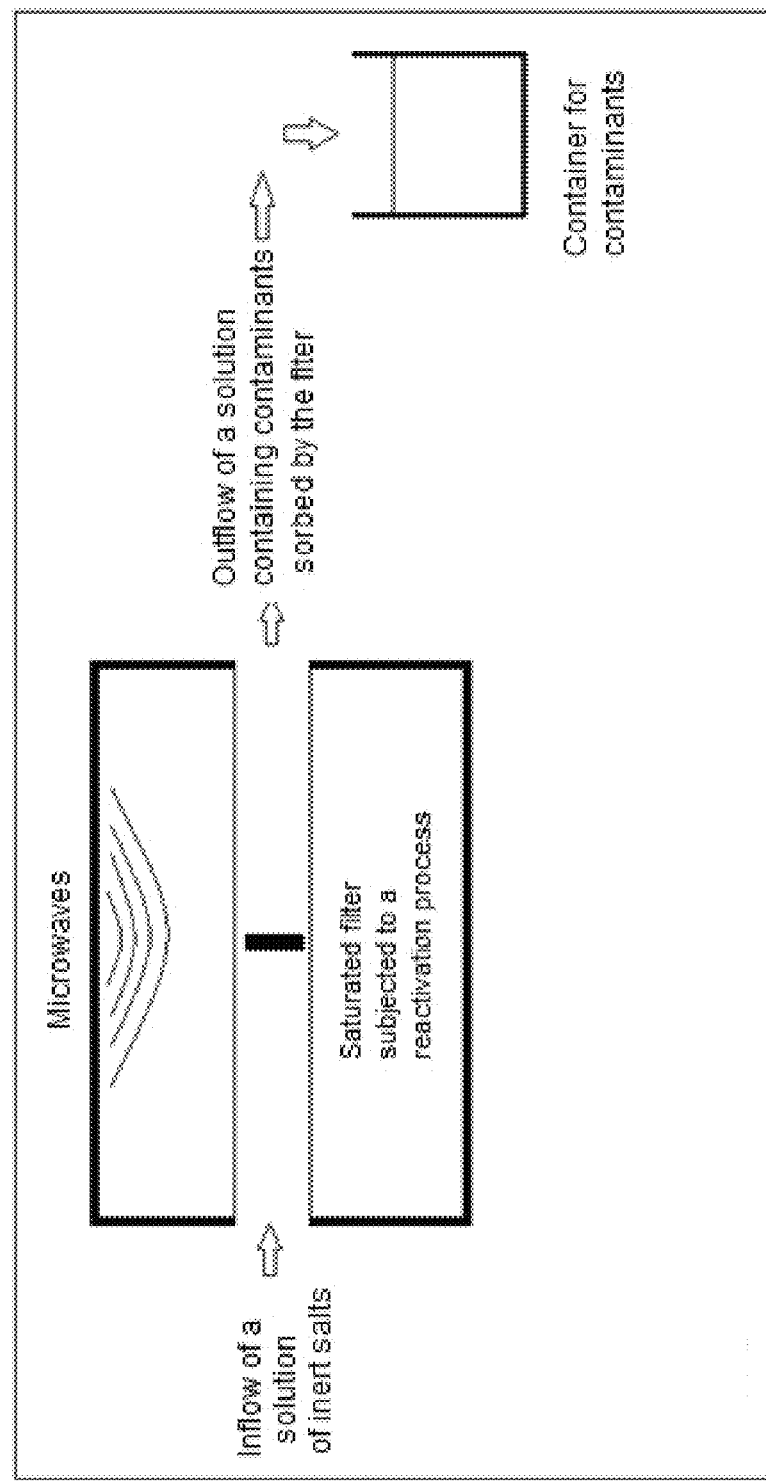
FIG. 1: Shows a diagram of the process of activation and regeneration of the invention on a filter material, through which inflow of a solution of inert salts is passed through this material, which is subjected at the same time to a source of microwaves radiation.
Figure 2:
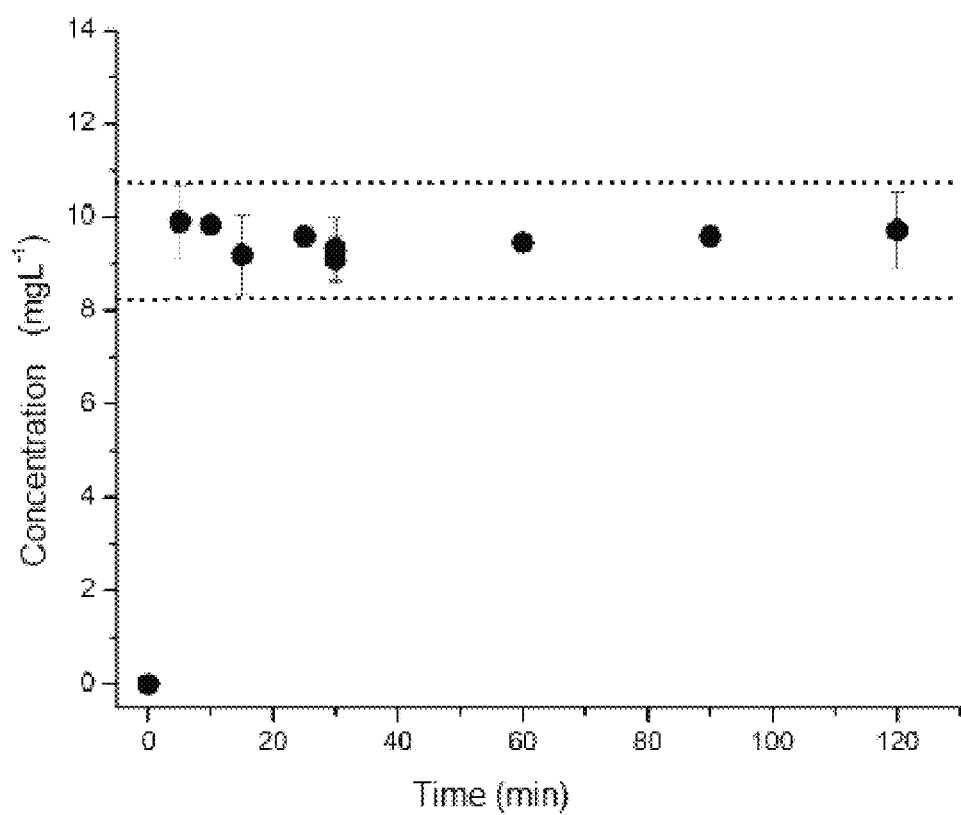
FIG. 2: Shows the conventional sorption time of arsenic, after the activation process of a filter material.
Figure 3:
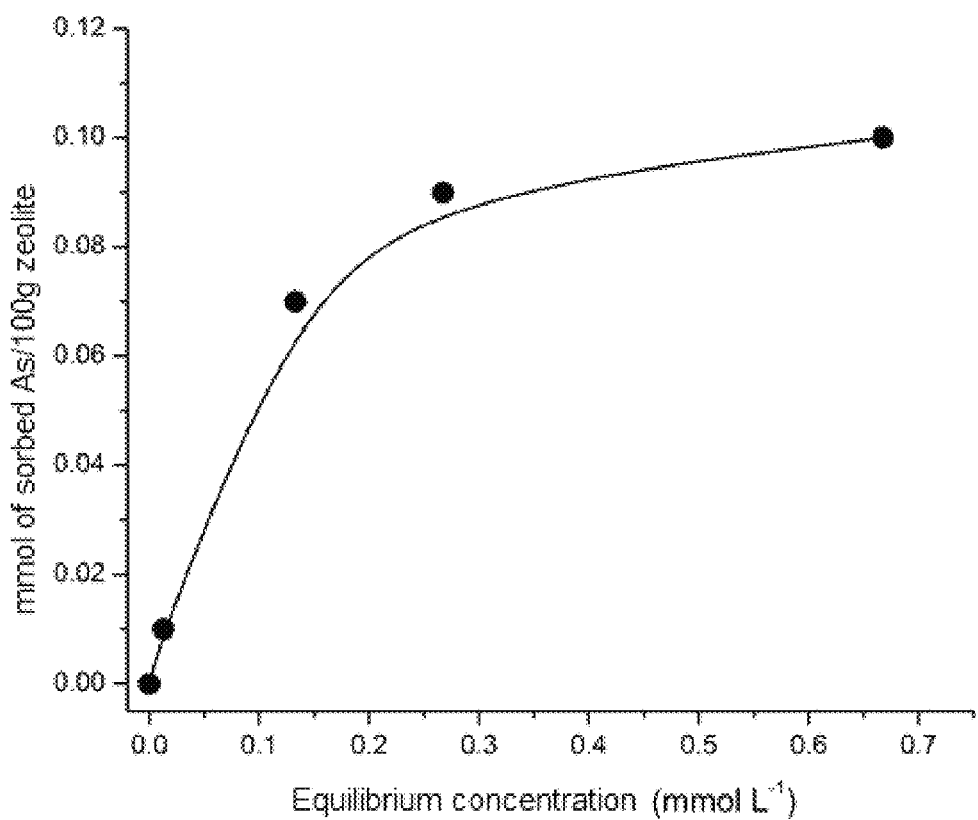
FIG. 3: Shows the sorption of arsenic, after the activation process of a filter material.
Figure 4:
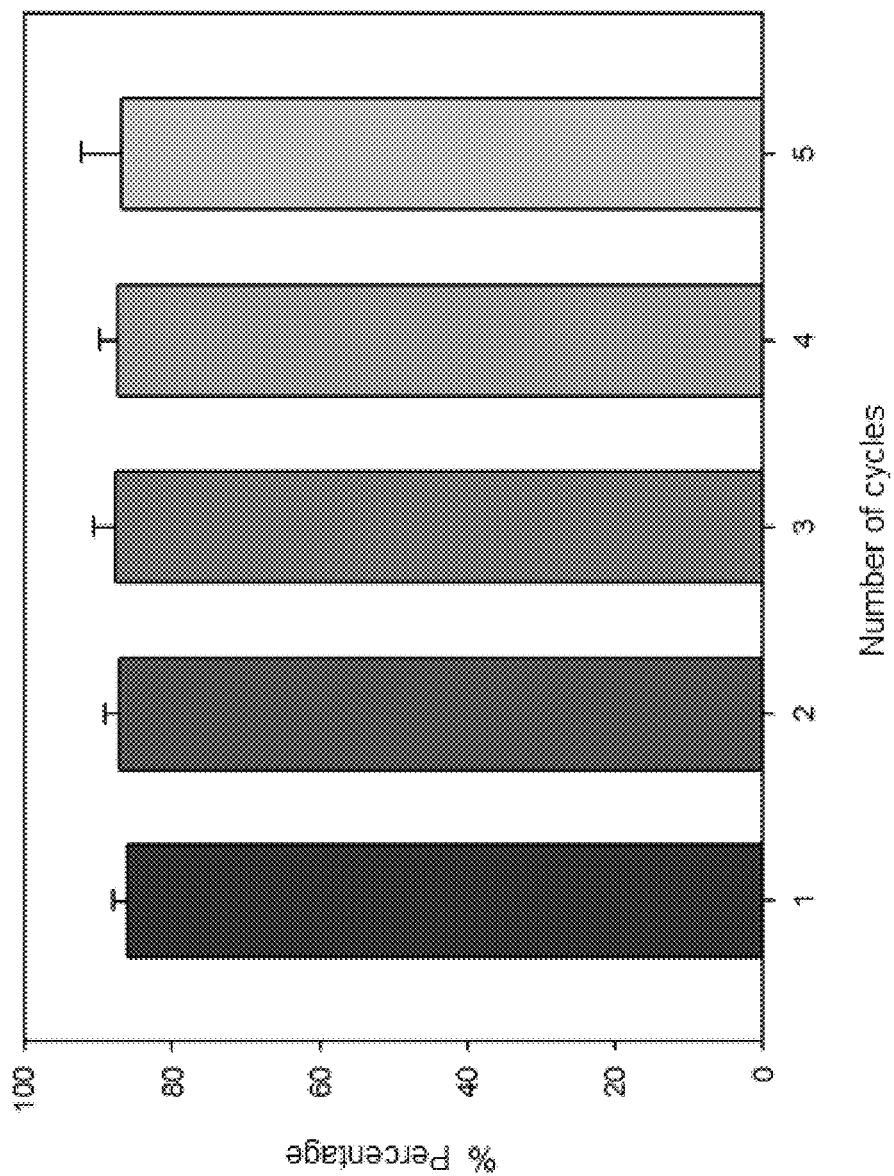
FIG. 4: Capacity of arsenic removal of a filter material, through the regenerative process of the invention, for four cycles of sorption-desorption.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

As seen in FIGS. 1-4, the present application proposes a method for activation and regeneration of filter materials, whereby simultaneous removal of various contaminants from the filtered fluid is produced. The regenerated filter material is preferably inorganic, and its origin can be both natural and synthetic. In a preferred mode of the invention, the filter material is aluminosilicate, which increases its sorption activity by using a previous activation process which uses a combination of, flow of inert salts and microwave radiation. The filter media and activated with this method, can be reused several times more, avoiding disposal with sorbed contaminants to the surrounding environment, which represents a way for the reduction of environmental pollution.

The regeneration method proposed in the present application, additionally allows the concentration of contaminants for possible reuse in some other mining or industrial process. This means to give added value to the polluting inorganic waste.

The arsenic sorption process occurs with an initial concentration of 20 mgL-1 of the metallic ion, obtaining a maximum sorption range of 8-11 mgL-1 in batch instantly. With the regeneration process, you get to the starting material with 95-85% regeneration. These results were obtained from tests of 8 independent samples. The regenerated material is used in a second cycle, absorbing 5-10 mgL-1. In a recovery process a material free of arsenic in a 9-80% of the material used initially. Even in the subsequent fourth reuse cycle, the material absorbed 5-10 mgL-1 in each cycle and freed 90-80% in each reactivation process.

The present application also has as an object the regenerated filter materials, which have been regenerated by using the method of the present invention, its derivates, as well as the process for the removal of contaminants and regeneration of filter materials using the same. Herein are provided selected examples.

The first example relates to activation of a used filter. A ratio of 1:10, which corresponds to 1 gram of filter material by 10 mL of activator solution, is used for the activation process. The activating solution is composed of $KNO_3$ and KCl, at a concentration of 1M. A flow is passed of the previous solution on a zeolite filter surface and is subjected at the same time to microwave radiation, providing energy equivalent to 1000 Watt. This process is done in the presence of air, keeping a constant agitation of the mixture.

Once the material has been activated with the salt solution, it is centrifuged to 3400 rpm for 10 minutes, the supernatant is discarded and the solid precipitate is dispersed in double distilled water, stirred for 30 minutes, the same process is repeated four times.

The second example relates to an Analysis of conventional sorption of contaminants. After the realization of the activation process of the surface, before the conventional sorption of the pollutants, it was necessary to determine the time of removal of contaminants, determining that the sorption of contaminant occurs immediately upon contact with filter material, regardless of the time in which the contact is made (FIG. 1).

It was observed that a sorption of 8-10 mgL1 is achieved. This means that with the proportion used of 1:10 (activated material:activating solution) said sorption is achieved. Once activated, samples are placed in contact with the solution polluting to reach balance, achieved the following method:

The samples of activated material are mixed with 10 ml of the pollutant solution, they are dispersed on the same, agitated and centrifuged at 3400 rpm for 10 minutes. The obtained supernatant is recovered for further analysis, and the solid with the absorbed cations is weighed.

The third example relates to regeneration of the filter material. The samples with a maximum concentration of pollutants, were subjected to the same desorption, using the process of regeneration of the invention. For this, to the filter material, in this case through the zeolite a flow of a solution of 2M $KNO_3$ and a salt derived from KOH solution, and undergoes a process of a microwave radiation with 1000 Watt.

After the above the determination of the presence of contaminants is made on samples, particularly arsenic, this was carried out by atomic absorption spectroscopy. The removal of contaminants up to 4 cycles of sorption and removal of contaminants, a removal percentage of 80 to 95% percent, which indicates that process carried out allows to efficiently regenerate the filter.

The particular embodiments and steps disclosed above are illustrative only, as the application may be modified and practiced in different but equivalent manners apparent to those skilled in the art having the benefit of the teachings herein. It is therefore evident that the particular embodiments and steps disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A method for activation and regeneration of a filter material, comprising:
    providing an inorganic filter material previously used;
    passing a first flow of a solution of inert salts over a surface of the material with a concentration between 0.5 and 1.5 M, radiating the material with microwaves with a potency between 600 to 1000 Watt;
    centrifuging the obtained material;
    recovering solid precipitate to be subjected to a new filtering cycle;
    subjecting the recovered filter material to a second flow of a solution of inert salts at a concentration between 1.5 and 3.5, radiating the material with microwaves;
    centrifuging again the material; and
    recovering the solid precipitate for using in a new filtering cycle.

2. The method of claim 1, wherein the salts are at least one of potassium salts and sodium salts.

3. The method of claim 1, wherein:
    the potassium salts for the first flow are $KNO_3$ and KCl and for the second flow the salts are $KNO_3$ and a salt derived from KOH; and
    the sodium salts for the first flow are $NaNO_3$ and NaCl and for the second flow the salts are $NaNO_3$ and a salt derived from NaOH.

4. The method of claim 1, wherein the filter material is at least one of a natural or synthetic auminosilicate.

5. A filter material subjected to a method of activation and regeneration, the method comprising:
    providing an inorganic filter material previously used;
    passing a first flow of a solution of inert salts over a surface of the material with a concentration between 0.5 and 1.5 M, radiating the material with microwaves with a potency between 600 to 1000 Watt;
    centrifuging the obtained material;
    recovering solid precipitate to be subjected to a new filtering cycle;
    subjecting the recovered filter material to a second flow of a solution of inert salts at a concentration between 1.5 and 3.5, radiating the material with microwaves;
    centrifuging again the material; and
    recovering the solid precipitate for using in a new filtering cycle.

6. The filter material of claim 5, wherein the salts are at least one of potassium salts and sodium salts.

7. The filter material of claim 5, wherein:
    the potassium salts for the first flow are $KNO_3$ and KCl and for the second flow the salts are $KNO_3$ and a salt derived from KOH; and
    the sodium salts for the first flow are $NaNO_3$ and NaCl and for the second flow the salts are $NaNO_3$ and a salt derived from NaOH.

8. The filter material of claim 5, wherein the filter material is at least one of a natural or synthetic auminosilicate.

* * * * *